J. L. MARTIN.
Odometer.
No. 15,140. Patented June 17, 1856.
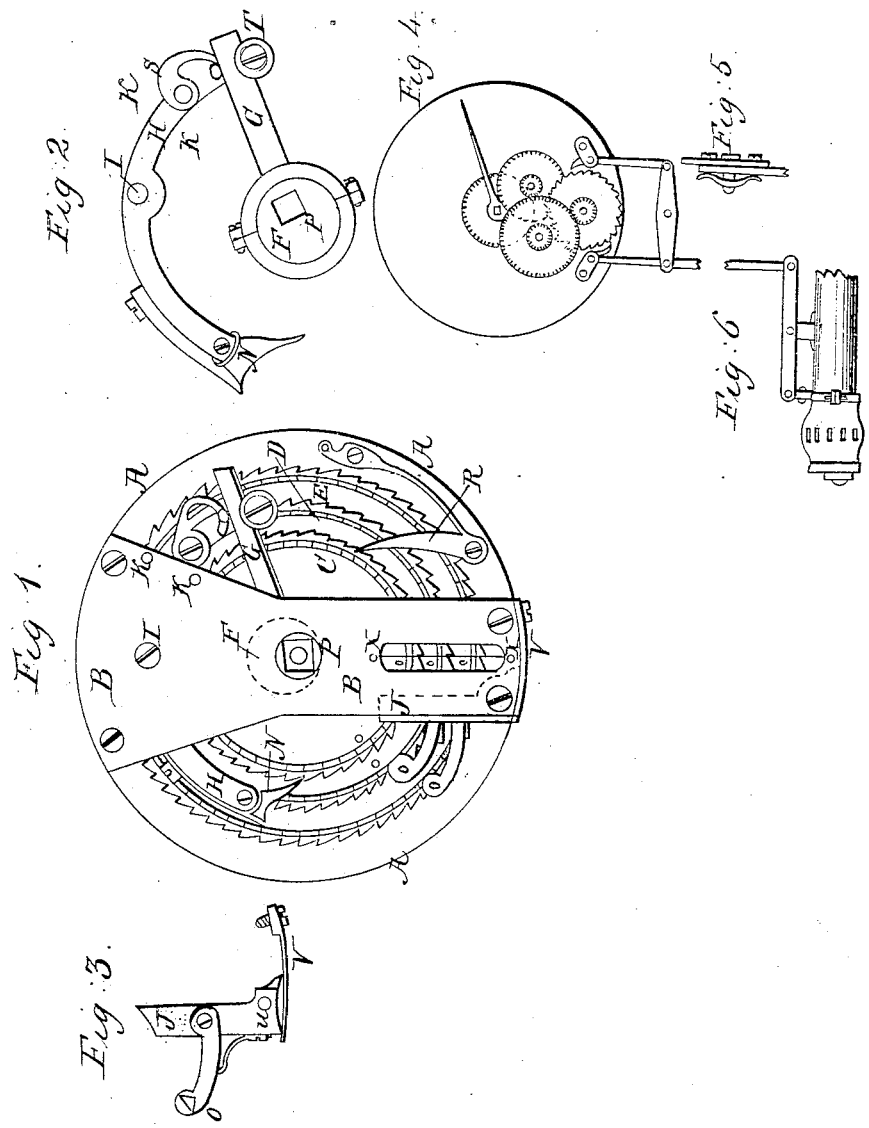

UNITED STATES PATENT OFFICE.

JOS. L. MARTIN, OF BALTIMORE, MARYLAND.

ODOMETER AND COUNTING-MACHINE.

Specification of Letters Patent No. 15,140, dated June 17, 1856.

*To all whom it may concern:*

Be it known that I, JOSEPH LLOYD MARTIN, of the city of Baltimore and State of Maryland, have invented a new and improved odometer or machine for indicating and registering the distances traveled or traversed by carriages, cars, locomotives, or other vehicles and the rates traversed by steam or sailing vessels, and which machine may also be used to indicate the number of revolutions made by engines or other machines where it is desirable to count and register the movements thereof, such as printing-presses, perambulators for measuring roods and surveying-calendars, and cloth measurers, &c.; and in order that others skilled, may be able to construct and apply my machine, I give the following first and general description.

The register and indicator may consist of the ordinary train of wheel work between two plates of metal, actuated by a ratchet wheel and pawl, connected to the motor, by means of my peculiar frictional connection which will be hereafter more fully described, or the indicator and register may consist of a series of wheels of the ratchet kind lying one above the other, and revolving around a common center—one wheel moving the other, by means of suitable jointed levers and clicks or pawls. The latter method of construction allows of the ready application to the end of a hub of carriage wheels, as will be described, and it also allows of a great number of revolutions in the first motor (without the intervention of a great number of wheels and pinions) to one revolution of the last indicating wheel—thereby rendering the construction comparatively cheap and simple and not liable to disarrangement. To make my method of construction more plain I give the following full and exact description of the drawings (by letters of reference) accompanying and forming a part of my specification.

*Description of drawings.*—Figure 1 represents a top view of the different parts of the machine as they appear together. A, A, A, is a plate of metal which turns upon the axle P. B, B, is a bridge secured to the plate A, A, by screws or otherwise. C, D, E are three ratchet wheels with any convenient number of teeth each wheel being a little larger in diameter than the one immediately above it, so as to allow the graduations which are marked on the wheels to be readily seen. These wheels all turn on a common center P, independently of each other. F is a cam or eccentric attached to the axle P which axle is attached to the axle around which the hub and carriage wheel revolves by any convenient means which will allow the odometer to be removed from it, and yet when affixed thereto shall prevent the axis of the odometer which operates the cam from revolving, so that the movements of the register may be made by their revolutions around a fixed axis. G is a connecting rod which communicates motion from the cam to the ratchet lever H which moves upon the screw I between the two stop pins *k k*, which stops instead of pins may be made adjustable by means of set screws. These stops being placed at such distances from each other as will allow the ratchet or pawl N to take into the proper number of teeth on the first ratchet wheel C. The first wheel C has a pin *q* near its edge which acts against the lever J, to which is attached a click or pawl *o*, taking into the teeth of the second wheel D, this pin acting against the lever in the revolution of the first wheel, draws, the second wheel by means of the pawl, forward one tooth or degree of graduation. The second wheel being provided in like manner with a pin, acting on a lever and pawl, draws the third wheel forward one degree with an entire revolution. The operation of this arrangement is as follows: An entire revolution of the first wheel is required to move the second wheel one tooth or degree, and one entire revolution is in like manner required of the second wheel to advance the third wheel one degree, so that a great number of revolutions of the first motor are indicated by the last wheel. R is a spring click or ratchet, which holds the first wheel from slipping back, and other ratchets may be applied to the other wheels, though the lever and pawls which bring the other wheels forward may be made to act in their stead. *x* is the index for showing the number of revolutions.

Fig. 2 shows the ratchet lever H detached, and the connecting rod and also the frictional arrangement. N is the ratchet, which feeds forward the ratchet wheel C in Fig. 1. G is the connecting rod which communicates motion from the cam, to the ratchet lever. S is a spring which passes the rod against the screw T. The cam gives more motion than is necessary to carry the lever against the pins *k k*. The rod for the rest of its movement slips between the spring S and the screw T. It will be seen from this provision any wear of the parts will not impair the accuracy of indication and registry.

Fig. 3 shows the form of the lever and spring click for moving the wheels D and E; J, the lever; *o*, the click; *u*, the hole in which the pin on which the lever turns is placed. *v* is a spring which is screwed to the bridge, for the purpose of throwing the lever back after having passed the wheel forward one degree and escaping from the pin which moves it.

In the arrangement of the train of wheel work, the first or moving ratchet wheel instead of being placed on the same center as the others may be made of smaller diameter and placed on one side so that a pin upon its face interlocking into the teeth of the second ratchet wheel shall move it the distance required—and instead of a single pawl may have a double one—taking alternately into each side of the wheel thus producing a continuous movement with each half revolution of the first motor. Represented in one arrangement at Fig. 6.

The odometer described in Fig. 1 may be applied to the end of the hub of a carriage by a rim connecting it therewith the eccentric being attached to the axle and the register revolving around it. The wheels at start being all set at zero or 0 the number of revolutions is determined by the numbers indicated by the index. A hinged cover may be attached to it and locked fast and opened when it is desired to see the number of revolutions made or the distance traveled, or instead of this arrangement upon the end of the hub the indicator may be placed upon the axle inside the wheel with its face lying in a plane with the axle so that the movement can be seen through a plate glass cover without the trouble of dismounting from the carriage. In this case the reciprocating movement may be produced by a bar passing against a projecting face screwed on the face of the hub at the shoulder of the axletree by means of a stiff spring—one end of this sliding bar being passed through the side of the odometer and connected with the ratchet lever by means of the spring clutch—the reciprocating movement of the bar being produced by the alternate action of the piece screwed on the face of the hub and the spring which passes it back.

In applying the odometer to steam or sailing vessels a spiral wheel or propeller may be placed in such part of the vessel near the keel as may be convenient, the axis of the propeller being on a line with the keel the propeller being exposed to the action of the water as the vessel passes through it. The propeller shaft has an eccentric upon it which communicates motion to a light connecting rod passing up through the vessel and attached to the indicator or register which may be placed at any convenient point for observation.

In applying the indicator to such operations as require great certainty or where there may be derangement of the adjustment between the ratchet lever and the rod which actuates it I would so hollow the rod on that side which is next the screw as to require a little more pressure to make it slip after carrying the rod to its position against the pins or stops. This arrangement would be necessary when applied to calendar clocks where a bell is required to be rung by the action of the wheel work.

I do not claim to be the first inventor of an odometer or machine for measuring distances traveled or traversed by carriages or other vehicles or steam or sailing vessels, as I am aware that several inventions for this purpose already exist. Neither do I claim to be the inventor of a tell tale as applied to registering the movements of machinery—nor of the calendar clock as usually made. But all machines of the kind and for the purposes above named with which I am acquainted differ entirely from mine, one peculiarity of which consists of communicating motion from the first motor to the registering train by means of such a connection by means of friction that while it allows excess of motion in the parts and compensates for wear, does not allow the accuracy of indication and registering to be thereby made less exact, this form of construction also producing very accurate results where they are required without involving the necessity of nice arrangement of other parts—and permits also a ready means of application to any machine which has a reciprocating movement.

Another peculiarity of my invention consists of the method of operating the train of wheel work by means of a central axis and cam, which axis is directly connected with that of the carriage wheel, and operates by this direct connection and not by means independent of it insuring thereby sufficient power to move the registering train and also to overcome the resistance of the frictional clutch upon the ratchet lever.

In constructing these machines I do not confine myself to the exact forms laid down in the drawings—for it is obvious that the same results may be obtained by means analogous though not inedtical—without changing the principles of application or action. But I do claim specifically the following parts, combinations, and applications:

1. The attachment of a friction clutch to the ratchet lever operating against the bar of the connecting rod for producing the requisite motion in the first wheel so arranged that any excess of motion in the bar will not produce excess of motion in the wheel—and I claim this whether in combination with the ordinary train of wheel work, with a single or double ratchet pawl, or in combination with the arrangement of wheel-work described.

2. Though I do not claim operating the count wheel by a cam or eccentric placed at its center, where this is actuated by means independent of the axle of the carriage and disconnected therefrom as by the weight and clutch of Julius Thompson, patented Oct. 31, 1854, I do claim the combination of the cam (whose axis is attached directly to the carriage axle) with the connecting rod and frictional clutch upon the ratchet lever made substantially as described.

JOS. LLOYD MARTIN.

Witnesses:
B. F. CAY,
W. M. PRATT.